(12) United States Patent
McCord et al.

(10) Patent No.: US 11,876,395 B2
(45) Date of Patent: Jan. 16, 2024

(54) TRACTOR BATTERY CHARGING MODULE

(71) Applicant: DEERE & COMPANY, Moline, IL (US)

(72) Inventors: Christopher T. McCord, Thomson, GA (US); David E. Leverett, Jr., North Augusta, SC (US)

(73) Assignee: DEERE & COMPANY, Moline, IL (US)

( * ) Notice: Subject to any disclaimer, the term of this patent is extended or adjusted under 35 U.S.C. 154(b) by 394 days.

(21) Appl. No.: 16/948,468

(22) Filed: Sep. 21, 2020

(65) Prior Publication Data
US 2022/0094190 A1 Mar. 24, 2022

(51) Int. Cl.
*H02J 7/00* (2006.01)
*B60L 53/20* (2019.01)
*B60L 1/00* (2006.01)
*B60L 58/12* (2019.01)

(52) U.S. Cl.
CPC .......... *H02J 7/007182* (2020.01); *B60L 1/00* (2013.01); *B60L 53/20* (2019.02); *B60L 58/12* (2019.02); *H02J 7/0048* (2020.01); *B60L 2210/12* (2013.01); *B60L 2210/14* (2013.01); *H02J 2207/20* (2020.01)

(58) Field of Classification Search
CPC ............... H02J 7/007182; H02J 7/0048; H02J 2207/20; H02J 7/342; B60L 1/00; B60L 53/20; B60L 58/12; B60L 2210/12; B60L 2210/14; B60L 1/20; B60L 58/13; B60L 58/20; B60L 2200/40; Y02T 10/70; Y02T 10/7072; Y02T 10/72; Y02T 10/92; Y02T 90/14
See application file for complete search history.

(56) References Cited

U.S. PATENT DOCUMENTS

| | | | |
|---|---|---|---|
| 3,456,119 | A | 7/1969 | Schneider |
| 3,953,740 | A | 4/1976 | Seiter, Jr. |
| 5,225,761 | A | 7/1993 | Albright |
| 5,488,283 | A | 1/1996 | Dougherty et al. |
| 6,320,358 | B2 | 11/2001 | Miller |
| 6,455,951 | B1 | 9/2002 | Shultz et al. |
| 7,989,969 | B2 | 8/2011 | Grant et al. |

(Continued)

FOREIGN PATENT DOCUMENTS

| | | |
|---|---|---|
| WO | WO2017013602 A1 | 1/2017 |
| WO | WO2018031719 A1 | 2/2018 |

OTHER PUBLICATIONS

Great Britain Search Report issued in Patent Application No. 2112309.6, dated Jan. 27, 2022, in 04 pages.

*Primary Examiner* — Nha T Nguyen

(57) ABSTRACT

A tractor battery charging module includes a compartment where a portable battery for a handheld battery power tool may be stored and connected to a tractor electrical system. The tractor electrical system charges the portable handheld tool battery in a first mode when the tractor ignition is on, and the portable handheld tool battery recharges the tractor battery in a second mode when the tractor ignition is off. The first mode includes a step up converter to convert the tractor electrical system voltage to the portable battery voltage, and the second mode includes a step down converter to convert the portable handheld tool battery voltage to the tractor electrical system voltage.

6 Claims, 5 Drawing Sheets

(56) References Cited

U.S. PATENT DOCUMENTS

| | | |
|---|---|---|
| 8,759,991 B2 | 6/2014 | Grant et al. |
| 9,276,438 B2 | 3/2016 | Grant et al. |
| 9,365,174 B2 | 6/2016 | Graham et al. |
| 2018/0115169 A1* | 4/2018 | Edwards ............... H02J 7/0048 |
| 2019/0199120 A1* | 6/2019 | Hoppel ............... H02J 7/00041 |

* cited by examiner

TRACTOR BATTERY CHARGING MODULE

FIELD OF THE INVENTION

This invention relates generally to a tractor battery charging module for use with portable or handheld battery powered tools.

BACKGROUND OF THE INVENTION

Tractors are often used to carry portable or handheld battery powered tools. The tractor electrical system is 12V and many portable or handheld battery powered tools require 18 to 60V. A tractor battery charging module is needed to charge portable or handheld battery powered tools, provide a recovery charge to the tractor battery, power intermittent use tractor accessories that require voltages above 12V, and support quiescent current requirements during tractor storage.

SUMMARY OF THE INVENTION

A tractor battery charging module for a portable battery used for a handheld battery powered tool. The tractor electrical system charges the portable battery in a first mode and the portable battery charges a tractor battery in the tractor electrical system in a second mode. A microprocessor connected to the tractor electrical system and the portable battery disables charging in the first mode if the portable battery is above a maximum charge level, and in the second mode if the portable battery charge is below a minimum charge level.

DESCRIPTION OF THE PREFERRED EMBODIMENT

Figure 1:
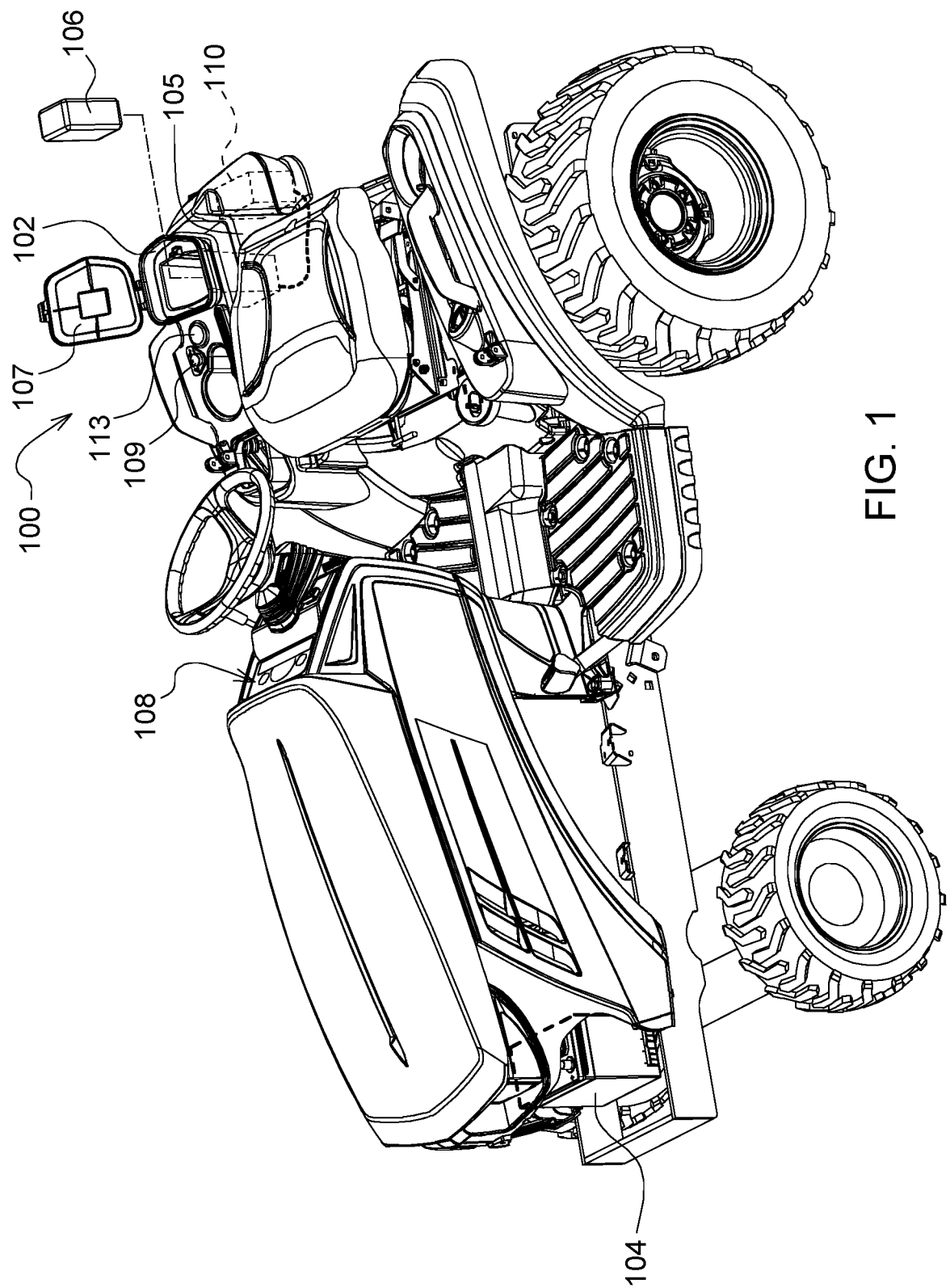
FIG. 1 is a perspective view of a tractor battery charging module according to a first embodiment of the invention.
Figure 2:
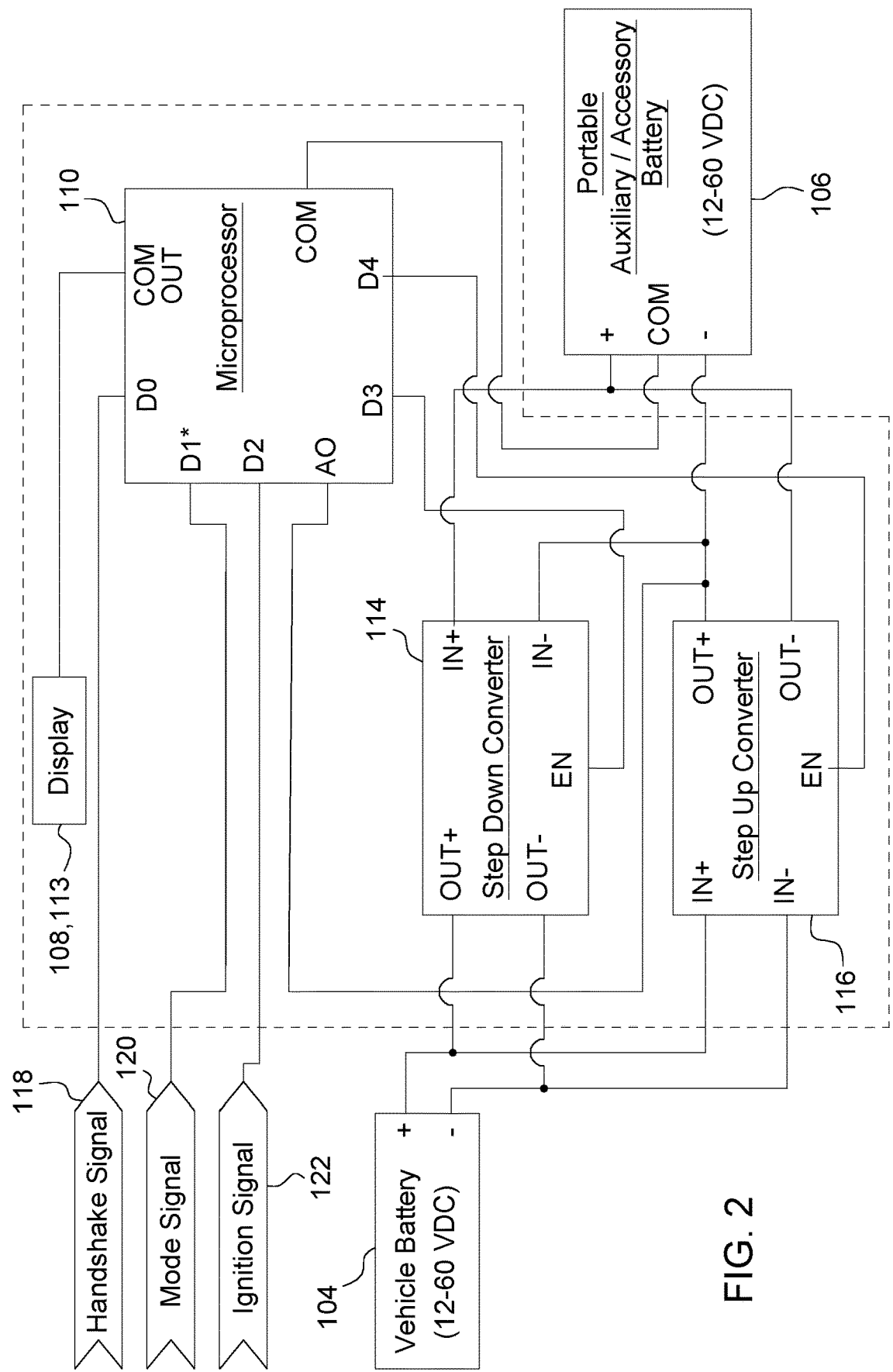
FIG. 2 is a block diagram of a tractor battery charging module according to a first embodiment of the invention.

In one embodiment shown in FIGS. 1-5, tractor battery charging module 100 may be mounted to a compact utility tractor, or other off road vehicle such as a grass mowing machine or utility vehicle. For example, the tractor battery charging module may include battery compartment 102 located above or adjacent the tractor's rear fender 105 where portable battery 106 used in a handheld battery powered tool may be plugged in and connected to the tractor electrical system. The compartment may have a hinged cover 107. Portable battery 106 may be connected to terminals at the bottom or side walls of compartment 102 for charging, and removed from the compartment for use with a handheld battery powered tool.

In one embodiment, tractor battery charging module 100 may include step down converter 114 and step up converter 116, both of which may be connected to the tractor electrical system. Step down converter 114 may convert a higher portable battery voltage up to 60V DC to a lower tractor electrical system voltage such as 12V DC. Step up converter 116 may convert a lower tractor electrical system or tractor battery voltage such as 12V DC to a higher portable battery voltage that is up to 60V DC. Both converters may be housed with microprocessor or charge controller 110 under or adjacent the tractor's rear fender and may be electrically connected to the terminals in compartment 102.

Figure 4:
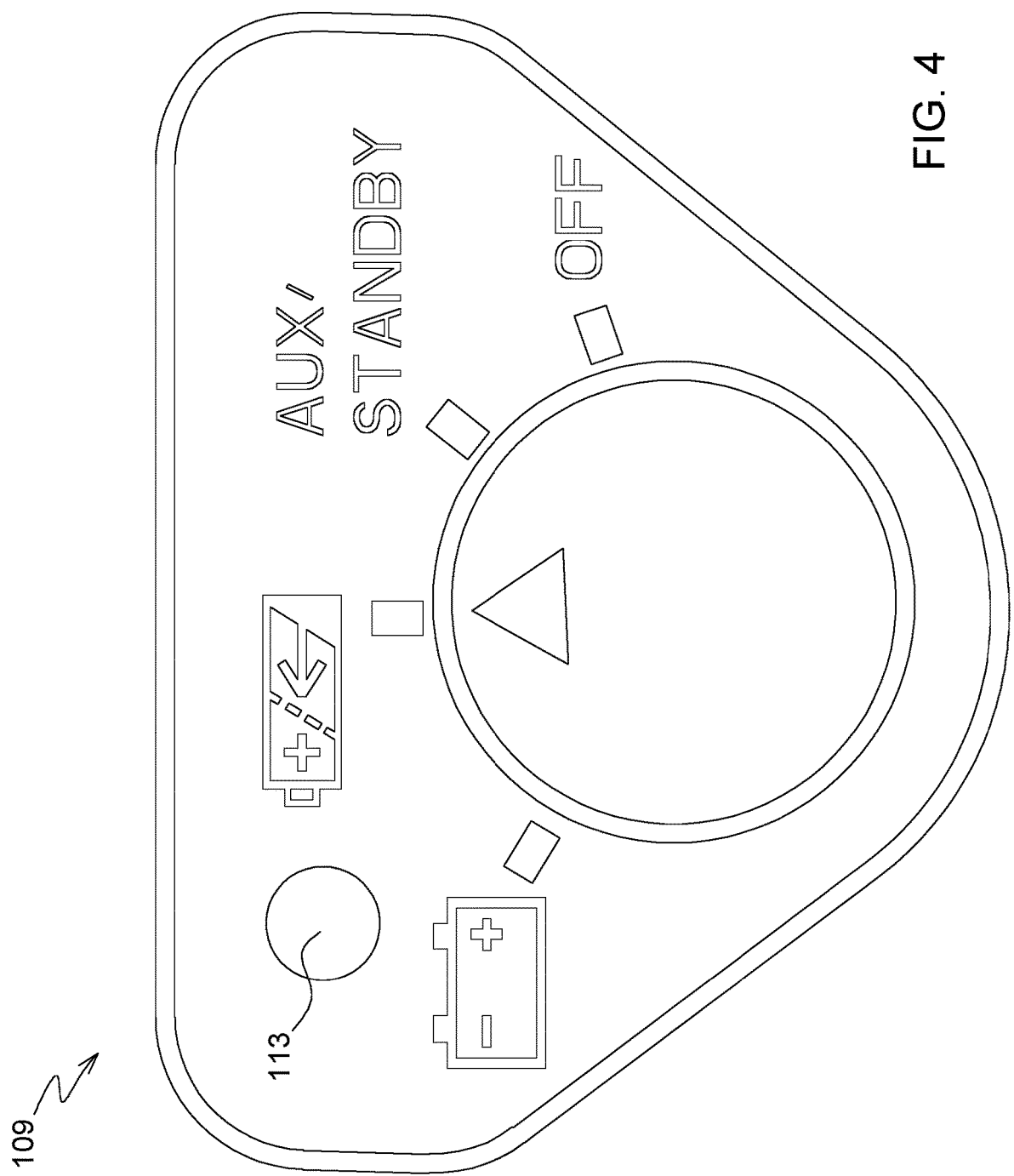
FIG. 4 is a top view of a charge mode selector switch for a tractor battery charging module according to a first embodiment of the invention.
Figure 5:
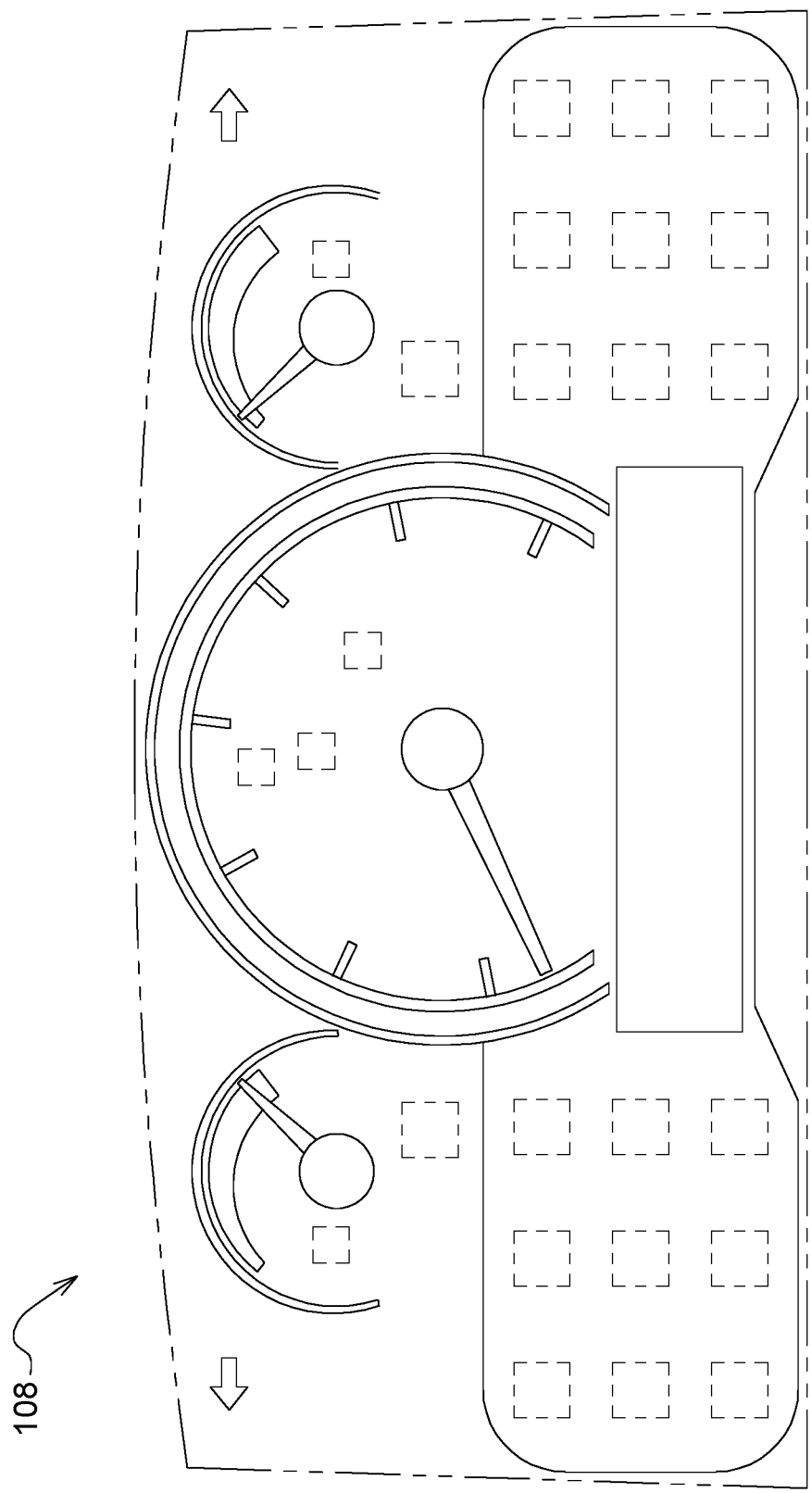
FIG. 5 is a front view of a tractor display for a tractor battery charging module according to a first embodiment of the invention.

In one embodiment, tractor battery charging module 100 may include mode selector switch 109 shown in FIG. 4, that the operator may turn to an off position, an auxiliary/standby mode position, a portable battery charging mode position, and a tractor battery charging mode position. The tractor battery charging module also may include tractor display 108 and/or charge controller display 113 to show the tractor battery charging module is active, the charge status, battery health, and other information. The display 113 may be dedicated to the charging module and located on or adjacent the charger compartment, or display 108 may be included on the vehicle console. Display 108 may show information regarding current charging status, such as portable battery charge state percentage, tractor battery voltage. Additionally, display 108 may provide a message if engine speed should be increased because charge rate is below a threshold, or if the battery should be checked. Additionally, indicator light 113 may be adjacent the charge mode selector switch and may be used to alert the operator of one or more charge status conditions.

In one embodiment, tractor battery charging module 100 may include microprocessor or charge controller 110 connected to the tractor electrical system. The microprocessor or charge controller may be housed under the tractor's rear fender. The microprocessor or charge controller may provide commands to the tractor electrical system and monitor the tractor electrical system and the portable battery.

Figure 3:
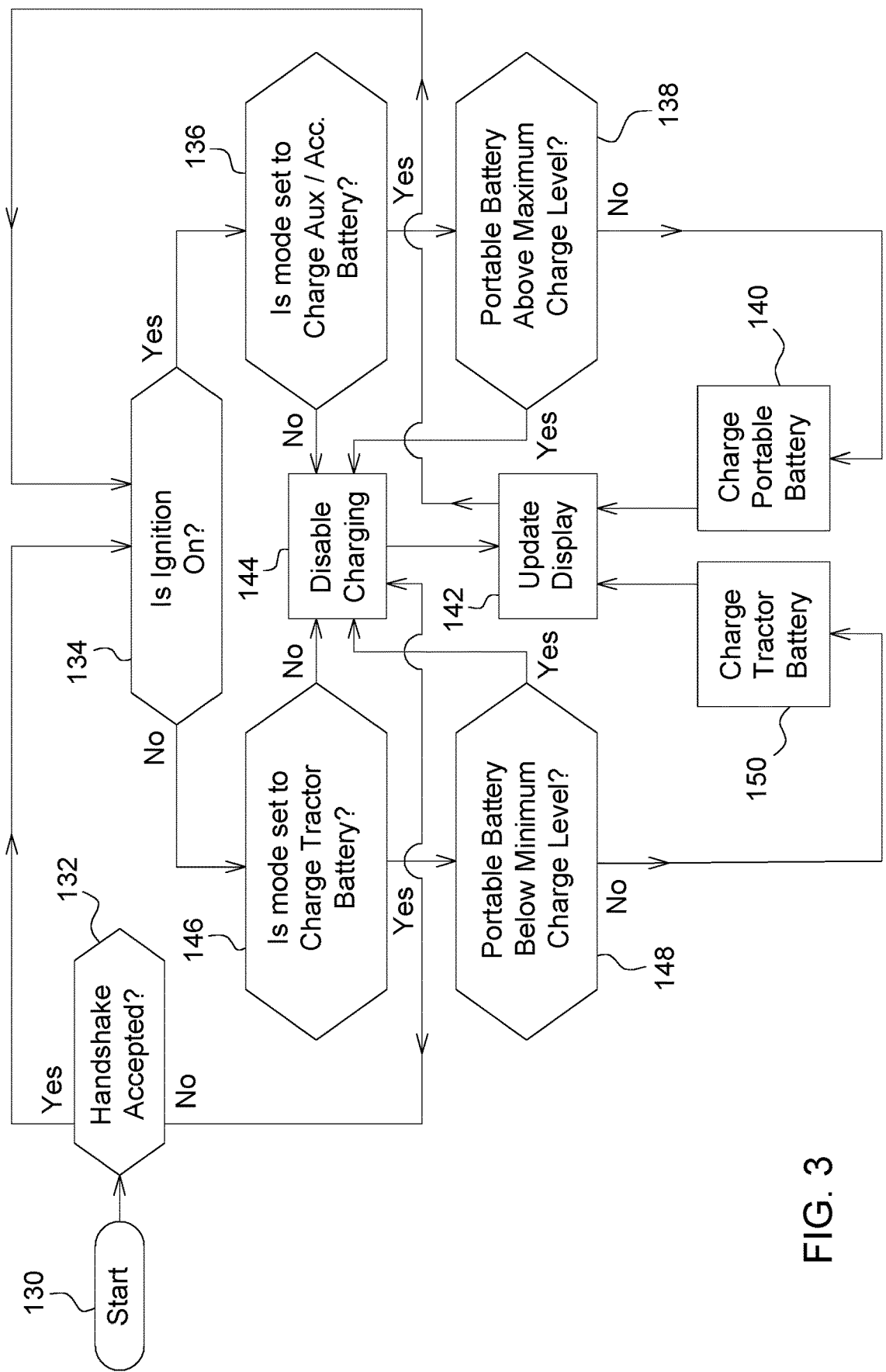
FIG. 3 is a logic diagram of a tractor battery charging module according to a first embodiment of the invention.

In one embodiment, microprocessor or charge controller 110 may monitor the voltage of the tractor electrical system. If the microprocessor reads the voltage of the tractor electrical system is below a specified voltage such as 12.8V, the microprocessor may disable charging of portable battery 106. The microprocessor or charge controller 110 also may monitor the depth of discharge of tractor battery 104 so that it does not exceed a specified percentage such as 75%. If the depth of discharge of the tractor battery exceeds the specified percentage, the microprocessor may disable charging of the portable battery. Additionally, microprocessor or charge controller 110 may vary the charge rate of portable handheld tool battery 106. The microprocessor may change the charge rate of the portable handheld tool battery within a range between about 1.5 A and about 6.5 A based on available power of the tractor electrical system. For example, if the vehicle electrical system voltage is greater than 12.8V, the microprocessor may increase charging current to the portable handheld tool battery toward the high end of the range. The microprocessor or charge controller also may monitor the engine speed along with the electrical system voltage level to determine electrical system status. Additionally, if the electrical system voltage is below a specified level, the microprocessor may provide a signal to display 108 to prompt the operator to increase engine speed to increase the charge rate of the portable handheld tool battery. Additionally, microprocessor or charge controller 110 may vary the recharge rate of tractor battery 104. For example, the microprocessor may vary the recharge rate based on available power of portable handheld tool battery 106, and may limit the recharge rate to a maximum of 30 amps until the portable handheld tool battery is depleted. Microprocessor or charge controller 110 may use a handshake signal to determine if portable handheld tool battery 106 is compatible with the tractor battery charging module. As shown in FIG. 3, microprocessor 110 may accept or deny a handshake signal in block 132 from handshake input 118. If the handshake signal is not accepted, charging may be disabled in block 144. The handshake signal may include data transfer between the tractor vehicle control unit (not shown) and microprocessor or charge controller 110 to confirm the tractor battery charging system can provide charge for the portable handheld tool battery 106 and the portable handheld tool battery is ready to be charged. Once confirmed, microprocessor or charge controller 110 may enable charge pass through from the tractor to charging module.

In one embodiment, as shown in FIG. 3, tractor battery charging module 100 may include a mode in which portable handheld tool battery 106 is charged from the tractor electrical system. The mode may use software logic executed by microprocessor or charge controller 110 when the ignition switch is on. If the handshake signal is accepted, the microprocessor may determine if ignition signal 122 is received indicating the tractor ignition switch is on in block 134. If the ignition signal indicates the tractor ignition switch is on, the microprocessor may determine if mode signal input 120 specifies charging the portable handheld tool battery in block 136. For example, mode signal input to the microprocessor or charge controller may be provided by operator actuation of mode selector switch 109 to the portable battery charging mode position. The mode also may be shown by the mode selector switch, indicator light 113, and/or status message on display 108. If the operator selects the mode for charging the portable handheld tool battery, the microprocessor may determine if the portable handheld tool battery is above the maximum charge level in block 138. If the portable handheld tool battery charge is not above the maximum charge level, the portable handheld tool battery may be connected to step up converter 116 and may be charged in block 140. The microprocessor may update display 108 in block 142, then return to block 134 to see if the ignition switch remains on. Charging the portable handheld tool battery may continue if the ignition switch is on in block 134, the mode specifies charging the portable handheld tool battery in block 136, and the portable handheld tool battery charge does not exceed the maximum charge level in block 138. Otherwise, the microprocessor may disable charging the portable handheld tool battery in block 144.

In one embodiment, as shown in FIG. 3, tractor battery charging module 100 may include a mode in which tractor battery 104 is recharged from the portable handheld tool battery 106. The tractor battery charging mode may use software logic executed by microprocessor or charge controller 110 to recharge the tractor battery when the tractor ignition switch is off. If the ignition signal indicates the ignition switch is off in block 134, the microprocessor may determine if mode signal input 120 specifies charging the tractor battery in block 146. If the operator uses the mode selector switch to charge the tractor battery, the microprocessor may determine if the portable handheld tool battery charge is below the minimum charge level in block 148. If the portable handheld tool battery charge is at least the minimum charge level, the tractor battery may be connected to step down converter and may be charged in block 150. The microprocessor may update display 108 and/or 113 in block 142, then return to block 134 to see if the ignition switch remains off. Charging the tractor battery may continue if the ignition switch is off in block 134, the mode specifies charging the tractor battery in block 146, and the portable handheld tool battery is not below the minimum charge level in block 148. Otherwise, the microprocessor may disable charging the tractor battery in block 144.

In one embodiment, tractor battery charging system 100 may include a mode in which portable handheld tool battery 106 provides power for intermittent use tractor accessories that require voltages above 12V, such as linear actuators or motors. For example, the operator may turn the mode selector switch to the auxiliary/standby mode position. The tractor battery charging system may pass high voltage charge from the portable handheld tool battery to a dedicated circuit on the tractor that may be controlled by microprocessor 110 to a tractor accessory that requires high voltage.

In one embodiment, tractor battery charging system 100 may have a mode in which portable handheld tool battery 106 provides power to support quiescent current requirements during tractor storage. The tractor battery charging system may monitor tractor voltage level when the tractor is not operating, such as when the tractor is in storage. When the tractor voltage level is below a set threshold, the microprocessor will command power from the portable handheld tool battery to pass to the tractor battery via the charge controller. The tractor battery charging system may continue to monitor the charge level of the tractor 12V battery and current during charging. When current flow decreases below a set threshold, the microprocessor will stop charging of the tractor 12V battery. The portable battery charging module may periodically monitor tractor voltage while in this mode.

Having described the preferred embodiments, it will become apparent that various modifications can be made without departing from the scope of the invention as defined in the accompanying claims.

The invention claimed is:

1. A tractor battery charging module, comprising:
a compartment on a tractor where a portable battery for a handheld battery power tool is stored and connected to a tractor battery in a tractor electrical system having a voltage that is lower than a portable battery voltage;
a microprocessor commanding the tractor battery electrical system to charge the portable battery in a first mode when a tractor ignition is on, and the portable battery to recharge the tractor battery in a second mode when the tractor ignition is off; and the portable battery powering tractor accessories at a voltage above the tractor battery in a third mode on a circuit controlled by the microprocessor.

2. The tractor battery charging module of claim 1 wherein the microprocessor limits a charging rate of the portable battery in the first mode based on the tractor electrical system voltage.

3. The tractor battery charging module of claim 1 wherein the microprocessor limits a recharging rate of the tractor battery in the second mode based on the portable battery voltage.

4. A tractor battery charging module, comprising:
a tractor electrical system connected to a portable battery for a handheld battery powered tool; the tractor electrical system charging the portable battery in a first mode and the portable battery charging a tractor battery in the tractor electrical system in a second mode; and the portable battery providing power to the tractor battery in a third mode if a voltage level of the tractor electrical system is below a set threshold needed to support a quiescent current requirement of the tractor electrical system when the tractor is not operating; and a microprocessor connected to the tractor electrical system and the portable battery that disables charging in the first mode if the portable battery is above a maximum charge level, and disables charging in the second mode if the portable battery charge is below a minimum charge level; and disables charging in the third mode if the quiescent current decreases below a set threshold.

5. The tractor battery charging module of claim 4, further comprising a mode switch to select either the first mode, or the second mode or the third mode.

6. The tractor battery charging module of claim 4 wherein the first mode requires a tractor ignition on, and the second mode or third mode requires the tractor ignition off.

* * * * *